United States Patent
Osterling et al.

(10) Patent No.: US 7,856,029 B2
(45) Date of Patent: Dec. 21, 2010

(54) PRE-START-UP PROCEDURE FOR INTERNAL INTERFACE OF DISTRIBUTED RADIO BASE STATION

(75) Inventors: Jacob Kristian Osterling, Järfälla (SE); Franz Heiser, Järfälla (SE); Klas Sjerling, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1841 days.

(21) Appl. No.: 10/909,843

(22) Filed: Aug. 3, 2004

(65) Prior Publication Data

US 2005/0107124 A1    May 19, 2005

Related U.S. Application Data

(60) Provisional application No. 60/520,323, filed on Nov. 17, 2003, provisional application No. 60/520,324, filed on Nov. 17, 2003, provisional application No. 60/520,325, filed on Nov. 17, 2003, provisional application No. 60/520,364, filed on Nov. 17, 2003.

(51) Int. Cl.
    *H04L 12/28* (2006.01)
    *H04J 3/16* (2006.01)

(52) U.S. Cl. .................. 370/437; 370/468

(58) Field of Classification Search .......... 370/503, 370/338, 401, 252, 254, 468, 437
    See application file for complete search history.

(56) References Cited

U.S. PATENT DOCUMENTS

| 5,870,392 A | 2/1999 | Ann |
| 6,178,126 B1 * | 1/2001 | Kirihata et al. ............. 365/200 |
| 6,337,659 B1 | 1/2002 | Kim |

(Continued)

FOREIGN PATENT DOCUMENTS

| EP | 1 294 045 A1 | 3/2003 |
| EP | 1 367 841 | 12/2003 |
| WO | 03/047130 A1 | 6/2003 |

OTHER PUBLICATIONS

CPRI Specification V1.0 (Sep. 30, 2003).*

(Continued)

*Primary Examiner*—Donald L Mills
*Assistant Examiner*—Mon Cheri S Davenport
(74) *Attorney, Agent, or Firm*—Nixon & Vanderhye, P.C.

(57) ABSTRACT

A radio base station (20) has an internal interface (26) connecting a radio equipment (RE) (24) and a radio equipment controller (REC) (22). The radio base station performs a pre-start-up procedure or method for the internal (26). The pre-start-up procedure is performed preparatory to and/or in conjunction with a start-up procedure for the internal interface. As on e of its aspects, the pre-start-up procedure involves storing one or more previously proven combinations of line bit rate and protocol as stored combination(s) for use on the internal interface. Prior to synchronization of the internal interface, the stored combination(s) are retrieved and included in a temporary available set of combinations of line bit rate and protocol. Thereafter the start-up procedure for the internal interface is initiated for the purpose of determining efficacy of the temporary available set. Should synchronization of the physical layer by the start-up procedure succeed, the pre-start-up procedure uses a valid combination of line bit rate and protocol in the available set for negotiating between the radio equipment controller (REC) and the radio equipment (RE). Should the start-up procedure fail, the pre-start-up procedure removes a failed combination of line bit rate and protocol from the set.

32 Claims, 11 Drawing Sheets

U.S. PATENT DOCUMENTS

| | | |
|---|---|---|
| 6,429,974 B1 | 8/2002 | Thomas et al. |
| 6,434,137 B1 | 8/2002 | Anderson et al. |
| 6,549,531 B1 | 4/2003 | Charas |
| 6,836,660 B1 | 12/2004 | Wala |
| 7,127,175 B2 | 10/2006 | Mani et al. |
| 2003/0076907 A1 | 4/2003 | Harris |
| 2003/0084206 A1* | 5/2003 | Floman et al. ................ 710/1 |
| 2003/0093540 A1 | 5/2003 | Lioy |
| 2004/0125740 A1 | 7/2004 | Gardner |
| 2005/0105534 A1 | 5/2005 | Österling |
| 2005/0105552 A1 | 5/2005 | Österling |
| 2006/0088125 A1 | 4/2006 | Miyatani et al. |
| 2007/0019679 A1 | 1/2007 | Scheck et al. |
| 2007/0058742 A1 | 3/2007 | Demarco et al. |
| 2007/0091896 A1 | 4/2007 | Liu |
| 2007/0116046 A1 | 5/2007 | Liu et al. |
| 2007/0133477 A1 | 6/2007 | Ebert et al. |
| 2007/0147488 A1 | 6/2007 | Han |
| 2007/0160012 A1 | 7/2007 | Liu et al. |

OTHER PUBLICATIONS

U.S. Office Action mailed Feb. 26, 2008 in corresponding U.S. Appl. No. 10/909,835.

U.S. Office Action mailed Sep. 27, 2007 in corresponding U.S. Appl. No. 10/909,836.

International Search Report mailed Feb. 28, 2005 in corresponding PCT application PCT/SE2004/001674.

International Search Report mailed Mar. 1, 2005 in corresponding PCT application No. PCT/SE2004/001673.

International Search Report mailed Feb. 28, 2005 in corresponding PCT application PCT/SE2004/001675.

Common Public Radio Interface (CPRI) Interface Specification Version 1.2 (Sep. 26, 2003).

Common Public Radio Interface (CPRI) Interface Specification Version 1.1 (May 10, 2004).

Chinese Office Action and English translation thereof mailed May 8, 2009 in corresponding Chinese application 200480033911.9.

* cited by examiner

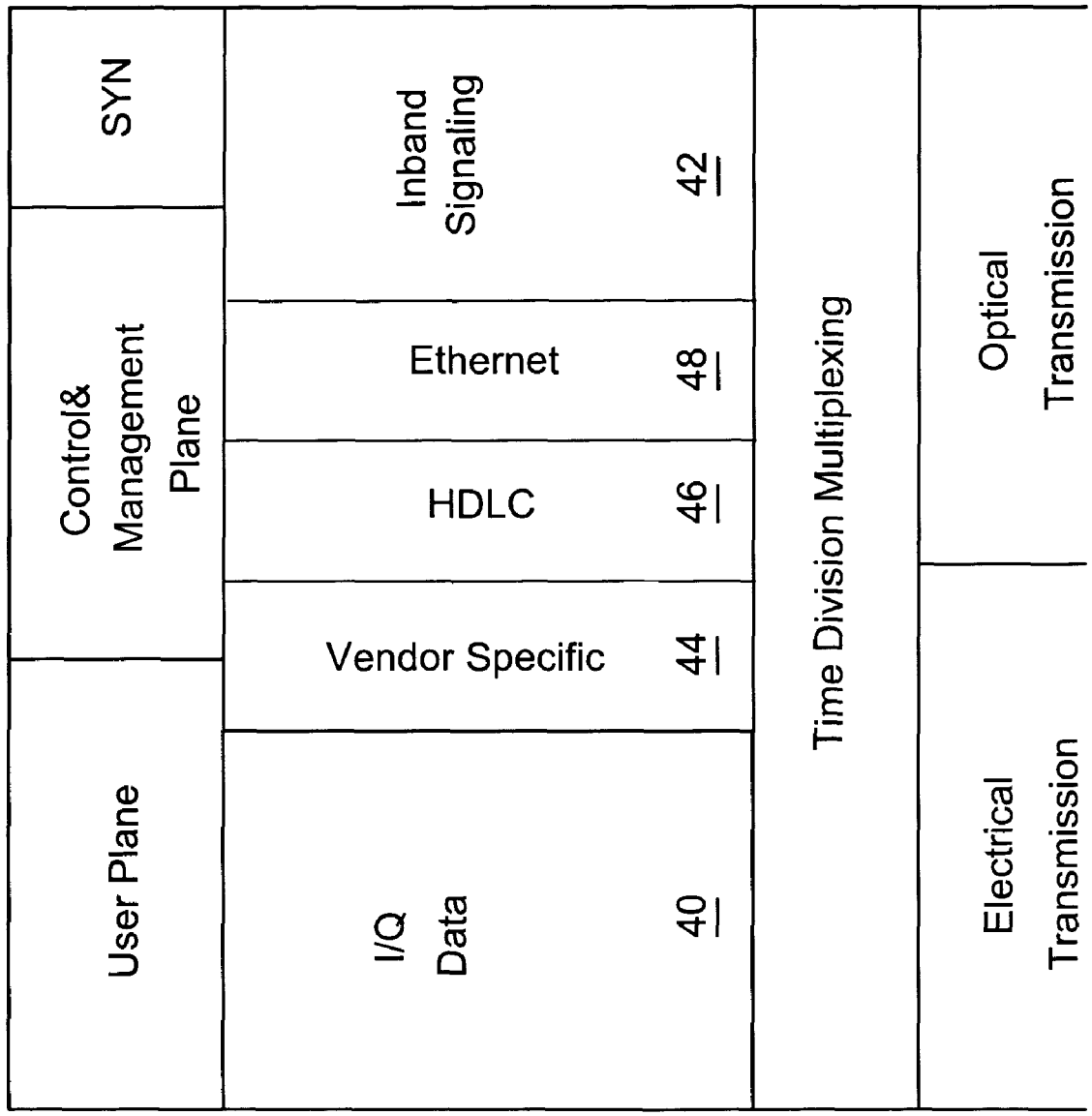

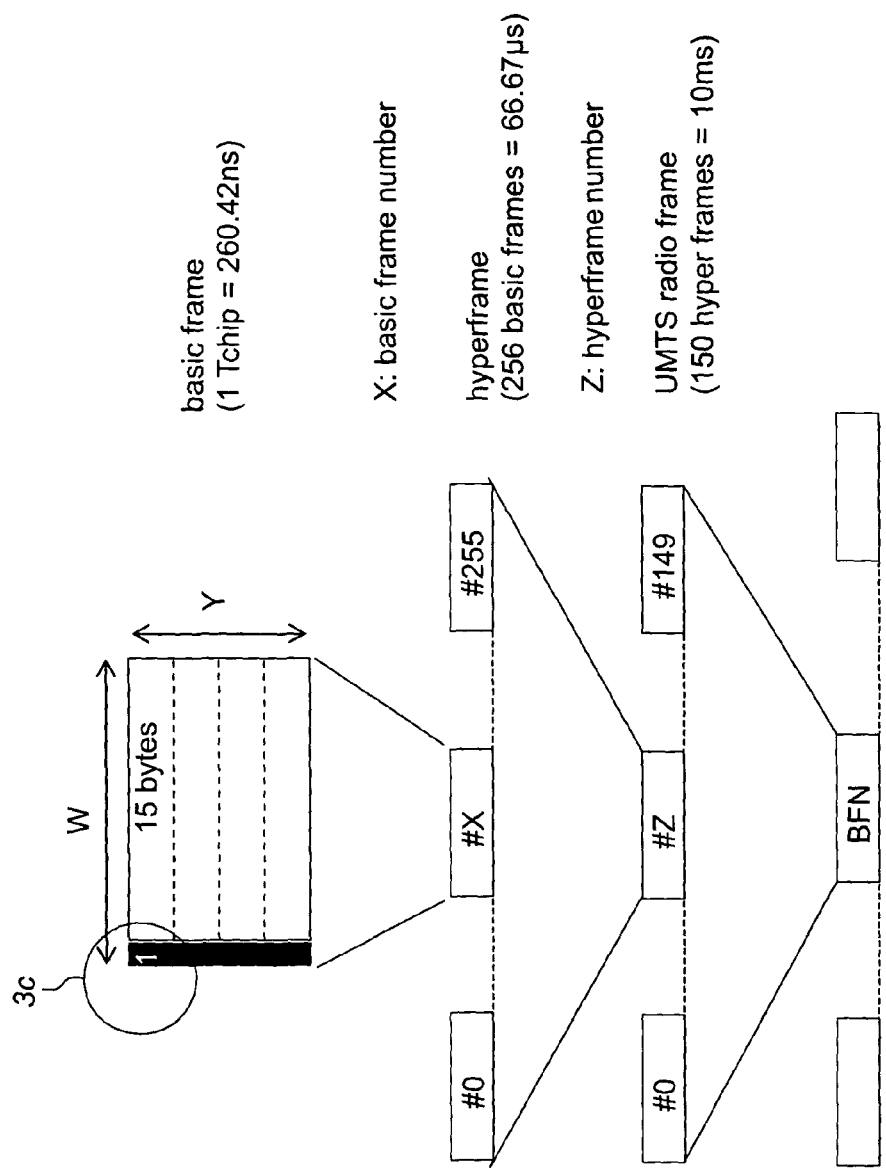
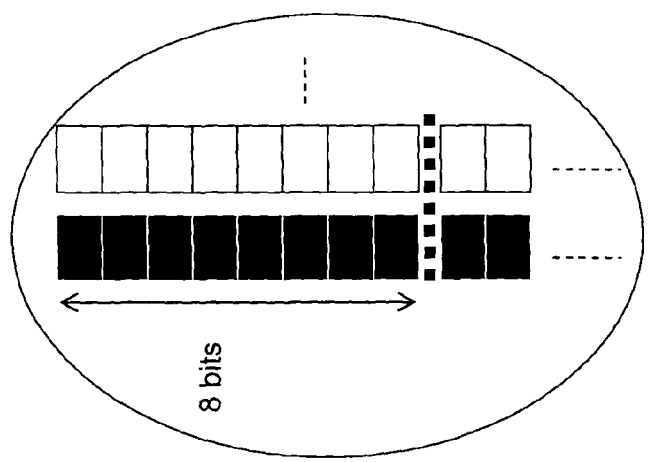
Fig. 3B
Fig. 3C

PRE-START-UP PROCEDURE FOR INTERNAL INTERFACE OF DISTRIBUTED RADIO BASE STATION

This application claims the benefit and priority of the following United States Provisional Patent Applications, all of which are incorporated herein by reference: (1) U.S. Provisional Application 60/520,323, filed Nov. 17, 2003 entitled "Encapsulation of Diverse Protocols Over Internal Interface of Distributed Radio Base Station"; (2) U.S. Patent Application 60/520,324, filed Nov. 17, 2003 entitled "Encapsulation of Independent Transmissions Over Internal Interface of Distributed Radio Base Station"; (3) U.S. Patent Application 60/520,364, filed Nov. 17, 2003 entitled "Interface, Apparatus, and Method for Cascaded Radio Units In A Main-Remote Radio Base Station"; and, (4) U.S. Patent Application 60/520,325, filed Nov. 17, 2003 entitled "Pre-Start-Up Procedure For Internal Interface of Distributed Radio Base Station". This application is related to the following simultaneously filed United States patent applications, all of which are incorporated by reference herein in their entirety: (1) U.S. patent application Ser. No. 10/909,835, entitled "Encapsulation of Diverse Protocols Over Internal Interface of Distributed Radio Base Station"; and (2) U.S. patent application Ser. No. 10/909,836, entitled "Encapsulation Of Independent Transmissions Over Internal Interface Of Distributed Radio Base Station".

BACKGROUND

1. Field of the Invention

This application is related to radio access networks involved in wireless telecommunications, and particularly relates to an internal interface (such as the Common Public Radio Interface (CPRI)) of a radio base station which links a radio equipment portion of the radio base station to a radio equipment control portion of the base station.

2. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a radio base station. A cell is a geographical area where radio coverage is provided by the radio equipment at a base station site. Each cell is identified by a unique identity, which is broadcast in the cell. The radio base stations communicate over the air interface (e.g., radio frequencies) with the user equipment units (UE) within range of the base stations. In the radio access network, several base stations are typically connected (e.g., by landlines or microwave) to a control node known as a base station controller (BSC) or radio network controller (RNC). The control node supervises and coordinates various activities of the plural radio base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which, at least in some respects, builds upon the radio access technology known as Global System for Mobile communications (GSM) developed in Europe. UTRAN is essentially a radio access network providing wideband code division multiple access (WCDMA) to user equipment units (UEs).

In many radio access networks the radio base station is a concentrated node with essentially most of the components being located at concentrated site. In the future mobile network operators may be afforded more flexibility if the radio base station is configured with a more distributed architecture. For example, a distributed radio base station can take the form of one or more radio equipment portions that are linked to a radio equipment control portion over a radio base station internal interface.

One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface Specification Version 1.0 (Sep. 26, 2003) and Version 1.1 (May 10, 2004), and which are incorporated by reference herein in their entirety.

The Common Public Radio Interface Specification Version 1.0 (Sep. 26, 2003) and Version 1.1 (May 10, 2004) describe a standardized start-up procedure which is supposed to accomplish two main objectives. The first objective is synchronization of the physical layer (layer 1), e.g., byte alignment and hyperframe alignment. The second objective is to align the capabilities of the radio equipment controller (REC) and the radio equipment (RE), particularly with respect to line bit rate, C&M (control and maintenance) link speed, C&M protocol, and vendor specific signaling. According to the specification, since there is no mandatory line bit rate of C&M link speed, the radio equipment controller (REC) and radio equipment (RE) must, during the start-up procedure, try different configurations until a common match is detected.

FIG. 11 illustrates the start-up states and transitions for the standardized start-up procedure discussed in the Common Public Radio Interface Specification Version 1.0 (Sep. 26, 2003) and Version 1.1 (May 10, 2004). FIG. 11 shows start-up states A through F, and sixteen possible transitions into or between states A through F. These states and transitions are applicable to each of the radio equipment controller (REC) portion and the radio equipment (RE) portion of the radio base station (RBS).

In state A, the RBS portion waits to be configured to start-up the internal interface, there thus far being no reception or transmission on the internal interface. In conjunction with state A, the Common Public Radio Interface Specification Version 1.0 (Sep. 26, 2003) and Version 1.1 (May 10, 2004) mention that the operator may configure a suitable start-up configuration (e.g., line bit rate, C&M link characteristics), and that the radio equipment controller (REC) and radio equipment (RE) may also have knowledge about a previous successful configuration.

In state B, an "available set" of line bit rate, protocol revisions, and C&M plane characteristics are known. According to the standard, this may be the complete set of the unit or a subset based on operator configuration or previous negotiation between the units (e.g., from state E). In state B the line bit rate of the interface is determined and both the radio equipment controller (REC) and the radio equipment (RE) reach a certain layer 1 synchronization.

The Common Public Radio Interface Specification Version 1.0 (Sep. 26, 2003) and Version 1.1 (May 10, 2004) state that the transition 1 from state A to state B is out of the scope of the specification, indicating that a set of available line bit rates, protocol revisions, and C&M link bit rates shall be available (the "available set"). The specification states that this may be the equipment full capabilities or a subset determined by the equipment configuration (manual) or knowledge from previous successful configurations.

The Common Public Radio Interface Specification Version 1.0 (Sep. 26, 2003) and Version 1.1 (May 10, 2004) further prescribe a layer 1 start-up timer. If the layer 2 start-up timer expires, transition 16 takes place and state B is entered, possibly modifying the available set of line bit rates and protocols.

Thus, Common Public Radio Interface Specification Version 1.0 (Sep. 26, 2003) and Version 1.1 (May 10, 2004) specify a standard start-up procedure with automatic negotiation of an "available set" of protocol and line bit rate. The standard start-up procedure as shown in FIG. 11 can be viewed as an "inner loop". The standard start-up procedure requires an "outer loop" of operations which is to provide the "available set" for the "inner loop" to use for negotiation. This "outer loop", which provides the "available set" for use in inner loop negotiations, is outside the specification.

The standard start-up procedure as prescribed by the Common Public Radio Interface Specification Version 1.0 (Sep. 26, 2003) and Version 1.1 (May 10, 2004) have some disadvantages. As a first disadvantage, the standard start-up procedure takes a long time if there are many line bit rates. As a second disadvantage, the standard start-up procedure can hang if the negotiation agrees upon a line bit rate and protocol for which no common C&M links are supported. A third disadvantage is that, when a line bit rate change is required, such a change must be executed very quickly, thereby imposing difficult requirements on the hardware.

What is needed therefore, and an object of the present invention, is a technique for supplying an available set of line bit rate and protocol to a start-up procedure for an internal interface of a distributed radio base station.

BRIEF SUMMARY

A radio base station has an internal interface connecting a radio equipment (RE) and a radio equipment controller (REC). The radio base station performs a pre-start-up procedure or method for the internal interface. The pre-start-up procedure is preformed preparatory to and/or in conjunction with a start-up procedure for the internal interface. The start-up procedure for the internal interface serves to synchronize a physical layer and align line bit rate and protocol over the internal interface. In one example implementation, the internal interface is a Common Public Radio Interface (CPRI).

As one of its aspects, the pre-start-up procedure involves storing one or more previously proven combinations of line bit rate and protocol as stored combination(s) for use on the internal interface. Prior to synchronization of the internal interface, the stored combination(s) are retrieved and included in a temporary available set of combinations of line bit rate and protocol. Thereafter the start-up procedure for the internal interface is initiated for the purpose of determining efficacy of the temporary available set.

Should synchronization of the physical layer by the start-up procedure succeed, the pre-start-up procedure uses a valid combination of line bit rate and protocol in the available set for negotiating between the radio equipment controller (REC) and the radio equipment (RE). A best combination of line bit rate and protocol is determined during the negotiating. Should the valid combination be agreed to be the best combination during the negotiating, the start-up procedure is end and an operational state entered. On the other hand, should the valid combination not be the best combination, only the best combination of line bit rate and protocol is included in the available set, and thereafter the start-up procedure is restarted. At various junctures the temporary active set is set to be the valid combination of line bit rate and protocol in order to expedite processing should the start-up procedure fail.

In another of its aspects, the pre-start-up procedure classifies the temporary available set into plural subsets, each subset of the temporary available set containing combinations of line bit rate and protocol having a same line bit rate. The pre-start-up procedure separately initiates the start-up procedure for the internal interface for each subset. The pre-start-up procedure can sequence in a predefined or preferred order the use of the subsets in the initiations of the start-up procedure. Since switching between different line bit rates takes time, this aspect of the pre-start-up procedure simplifies hardware design.

In another of its aspects, the pre-start-up procedure classifies the stored combinations as: (1) a best last time combination of line bit rate and protocol which was involved in a last successful execution of the start-up procedure; and (2) a union all combinations of line bit rate and protocol for which the synchronization of the physical layer has previously been successful during the start-up procedure. Capitalizing upon this classification, the pre-start-up procedure can use the best last time combination as the temporary available set for initiating the start-up procedure for the internal interface. Then, if the start-up procedure fails, the pre-start-up procedure can resort to using the union of all combinations as the temporary available set for initiating the start-up procedure for the internal interface.

In another of its aspects, after the pre-start-up procedure has initiated the start-up procedure for the internal interface to determine efficacy of a set of combinations of line bit rate and protocol, the pre-start-up procedure removes a failed combination of line bit rate and protocol from the set should the start-up procedure fail.

In example embodiments, the pre-start-up procedure is performed by a controller which can take the form of a processor or of a dedicated logic part (e.g., part of an ASIC).

BRIEF DESCRIPTION OF THE DRAWINGS

FIG. 2 is a diagrammatic view of a protocol overview for an interface between radio equipment controller (REC) 22 and a radio equipment (RE) 24.

FIG. 3B is a diagrammatic view of a hyperframe structure for one example implementation.

FIG. 3C is an enlargement of a portion of FIG. 3B.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
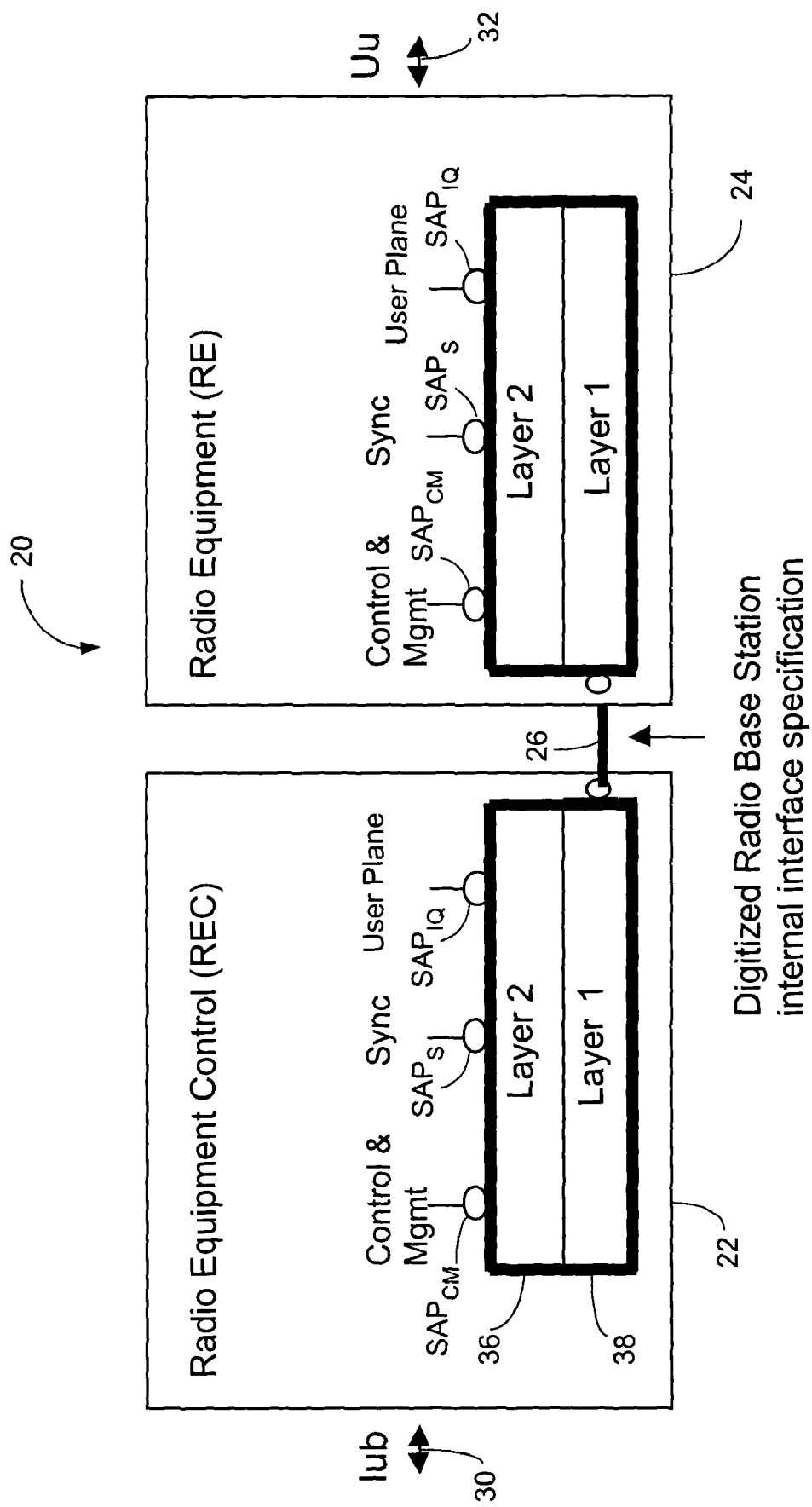
FIG. 1 is a schematic view of an example embodiment of a distributed radio base station.

FIG. 1 shows an example embodiment of a distributed radio base station 20. The radio base station 20 comprises both a radio equipment controller (REC) 22 and a radio equipment (RE) 24. The radio equipment controller (REC) 22 and radio equipment (RE) 24 are connected by an internal interface 26. In the example implementation herein described, internal interface 26 is a CPRI link. Details of structure and operation of radio base station 20 and an internal interface 26 which takes the form of a CPRI link are understood from the Common Public Radio Interface Specification Version 1.0 (Sep. 26, 2003) and Version 1.1 (May 10, 2004), which are incorporated by reference herein in their entirety. As in the specification, the description herein is based on the UMTS (Universal Mobile Telecommunication System) nomenclature. However, the radio base station 20 and the internal interface 26 may operate in accordance with other radio standards.

The radio equipment controller (REC) 22 and radio equipment (RE) 24 may be physically separated (i.e., the radio equipment (RE) 24 may be close to the antenna, whereas the radio equipment controller (REC) 22 may be located in a conveniently accessible site). Alternatively, both radio equipment controller (REC) 22 and radio equipment (RE) 24 may be co-located as in a conventional radio base station design. Whatever the distance therebetween, in view of their physical separation the location of the radio equipment controller (REC) 22 is known as the main site and the location of the radio equipment (RE) 24 is known as the remote site.

As illustrated in FIG. 1, radio equipment controller (REC) 22 provides an access towards an unillustrated Radio Network Controller via the Iub interface 30 (for the UMTS radio access network). Basically, the radio equipment controller (REC) 22 is concerned with the Iub transport and Iub protocols, the Node B (base station) control and management, as well as the digital baseband processing. For the downlink (i.e., from radio equipment controller (REC) 22 to radio equipment (RE) 24), the radio equipment controller (REC) 22 handles such operations as channel coding, interleaving, spreading, scrambling, adding of physical channels, controlling transmit power of each physical channel, frame and slot signal generation (including clock stabilization). For the uplink (i.e., from radio equipment (RE) 24 to radio equipment controller (REC) 22), the radio equipment controller (REC) 22 handles such operations as channel de-coding, de-interleaving, de-spreading, de-scrambling, signal distribution to signal processing units, detection of feedback information for transmit power control, and signal to interference ratio measurement.

The radio equipment (RE) 24 serves the air interface 32 to the user equipment (in an UMTS network the air interface is called the Uu interface). The user equipment unit, or mobile station, is not illustrated in FIG. 1. The radio equipment (RE) 24 provides the analogue and radio frequency functions such as filtering, modulation, frequency conversion and amplification. For the downlink, the radio equipment (RE) 24 performs operations such as digital to analogue conversion, up conversion, on/off control of each carrier, carrier multiplexing, power amplification and limiting, antenna supervision, and RF filtering. For the uplink, the radio equipment (RE) 24 performs operations such as analogue to digital conversion, down conversion, automatic gain control, carrier de-multiplexing, low noise amplification, and RF filtering.

Thus, the radio equipment controller (REC) 22 comprises the radio functions of the digital baseband domain, whereas the radio equipment (RE) 24 contains the analogue radio frequency functions. The functional split between both parts is done in such a way that a generic interface based on In-Phase and Quadrature (IQ) data can be defined.

The Common Public Radio Interface Specification Version 1.0 (Sep. 26, 2003) and Version 1.1 (May 10, 2004) define protocols for the physical layer 34 (layer 1) and the data link layer 36 (layer 2). Layer 1 defines, e.g., electrical characteristics, optical characteristics, time division multiplexing of the different data flows, and low level signaling. Layer 2 defines the media access control, flow control and data protection of the control and management information flow.

The Common Public Radio Interface Specification Version 1.0 (Sep. 26, 2003) and Version 1.1 (May 10, 2004) further describe four protocol data planes: control plane, management plane, user plane, and synchronization. These four protocol data planes are illustrated in FIG. 2.

The control plane involves control data flow used for call processing. The management plane carries management information for the operation, administration and maintenance of the CPRI link and the radio equipment (RE) 24. The control and management data is exchanged between control and management entities with the radio equipment controller (REC) 22 and radio equipment (RE) 24, and is given to higher protocol layers. The control and management plane is mapped to a single information flow over the CPRI link.

The user plane concerns data that has to be transferred from the radio base station to the mobile station and vice versa. The user plane data is transported in the form of in-phase and quadrature (IQ) modulation data (digital base band signals), represented by block 40 in FIG. 2. Several IQ data flows will be sent via one physical CPRI link 26. Each IQ data flow reflects the data of one antenna for one carrier, the so-called antenna-carrier (AxC). In general, without regard to specific protocol, one antenna-carrier is the amount of digital baseband (IQ) U-plane data necessary for either reception of transmission of one carrier at one independent antenna element. An AxC container contains the IQ samples of one AxC for one UMTS chip duration. Each flow in the user plane has reserved a certain bit field per frame, denoted as the AxC carrier. When the internal interface 26 is a CPRI interface, the AxC container contains samples of a chip an a UTRA-FDD carrier.

Synchronization pertains to data flow which transfers synchronization and timing information between radio equipment controller (REC) 22 and radio equipment (RE) 24. Synchronization data is used for alignment of the 8B/10B coder as well as the detection of chip, hyperframe, radio frame boundaries, and associated frame numbering.

Inband signaling, depicted by block 42 in FIG. 2, is signaling information that is related to the link and is directly transported by the physical layer. This information is required, e.g. for system startup, layer 1 link maintenance and the transfer of time critical information that has a direct time relationship to layer 1 user data.

Block 44 of FIG. 2 shows vendor specific information, i.e., an information flow which is reserved for vendor specific information. This vendor specific information area typically has about 50 Mbps free bandwidth.

There are service access points (SAP) for all protocol data plane layer 2 services which are used as reference points for performance measurements. As illustrated in FIG. 1, for both radio equipment controller (REC) 22 and radio equipment (RE) 24 there are service access points $SAP_{CM}$, $SAP_S$, and $SAP_{IQ}$ for the control & management planes, the synchronization plane, and the user plane, respectively.

Thus, in addition to the user plane data (IQ data), control and management as well as synchronization signals have to be exchanged between radio equipment controller (REC) 22 and radio equipment (RE) 24. All information streams are multiplexed onto a digital serial communication line using appropriate layer 1 and layer 2 protocols. The different information flows have access to the layer 2 via the appropriate service access points (SAPs). These information streams define the common public radio interface.

The IQ data of different antenna carriers are multiplexed by a time division multiplexing scheme onto an electrical or optical transmission line forming the internal interface 26. The Control and Management data are either sent as inband signalling (for time critical signalling data) or by layer 3 protocols (not defined by Common Public Radio Interface Specification Version 1.0 (Sep. 26, 2003) and Version 1.1 (May 10, 2004)) that reside on top of appropriate layer 2 protocols. Two different layer 2 protocols—High Data Level Link Control (HDLC) and Ethernet, depicted as 46 and 48, respectively, in FIG. 2—are supported by CPRI. These additional control and management data are time multiplexed with the IQ data. Finally, additional time slots are available for the transfer of any type of vendor specific information (block 42).

Figure 3A:
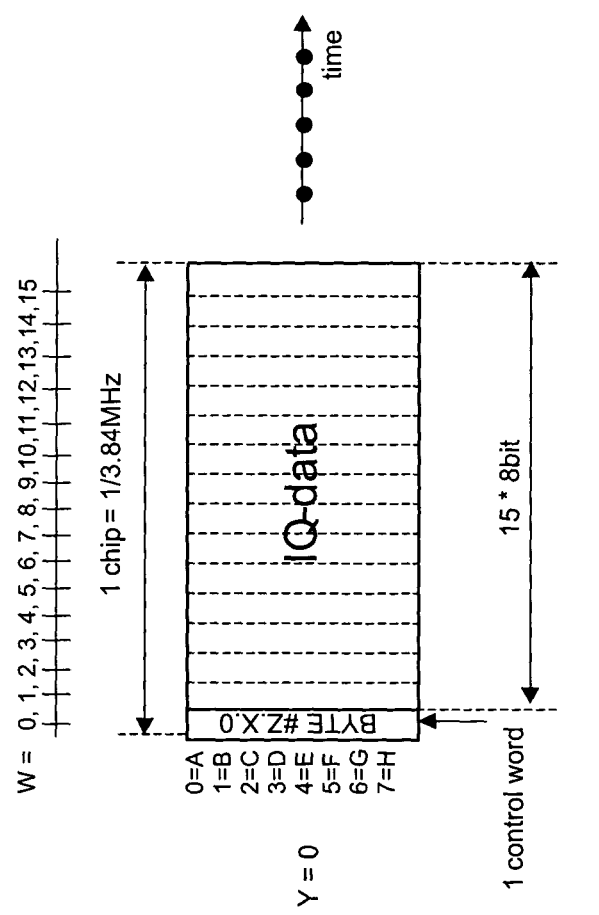
FIG. 3A is a diagrammatic view of basic frame structure for one example data rate for use over an internal interface for the distributed base station.

Information flow over the internal interface 26 of radio base station 20 is carried in frames. In the example implementation which is compatible with Common Public Radio Interface Specification Version 1.0 (Sep. 26, 2003) and Version 1.1 (May 10, 2004), the length of a basic frame is 1 Tchip=1/3.84 MHz=260.416667 ns. As shown in FIG. 3A, for such compatible implementation a basic frame consists of 16 words with index W=0 . . . 15. The word with the index W=0, 1/16 of the basic frame, is used for one control word. The length T of the word depends on the total data rate. The Common Public Radio Interface Specification Version 1.0 (Sep. 26, 2003) and Version 1.1 (May 10, 2004) define three alternative data rates, each with differing word lengths: 614.4 Mbit/s (length of word T=8); 1228.8 Mbit/s (length of word T=16); and 2457.6 Mbit/s (length of word T=32). FIG. 3A illustrates the frame structure for the 614.4 Mbit/s total data rate.

The Common Public Radio Interface Specification Version 1.0 (Sep. 26, 2003) and Version 1.1 (May 10, 2004) also define a hyperframe structure which is hierarchically embedded between the basic frame and the UMTS radio frame as shown in FIG. 3B. In FIG. 3B, Z is the hyperframe number; X is the basic frame number within a hyperframe; W is the word number within a basic frame; and Y is the byte number within a word. The control word is defined as word with rank W=0. Each bit within a word can be addressed with the index B, where B=0 is the LSB of the BYTE Y=0, B=8 is the LSB of BYTE Y=1, B=16 is the LSB of BYTE Y=2, and B=24 is the LSB of BYTE Y=3.

Figure 4:
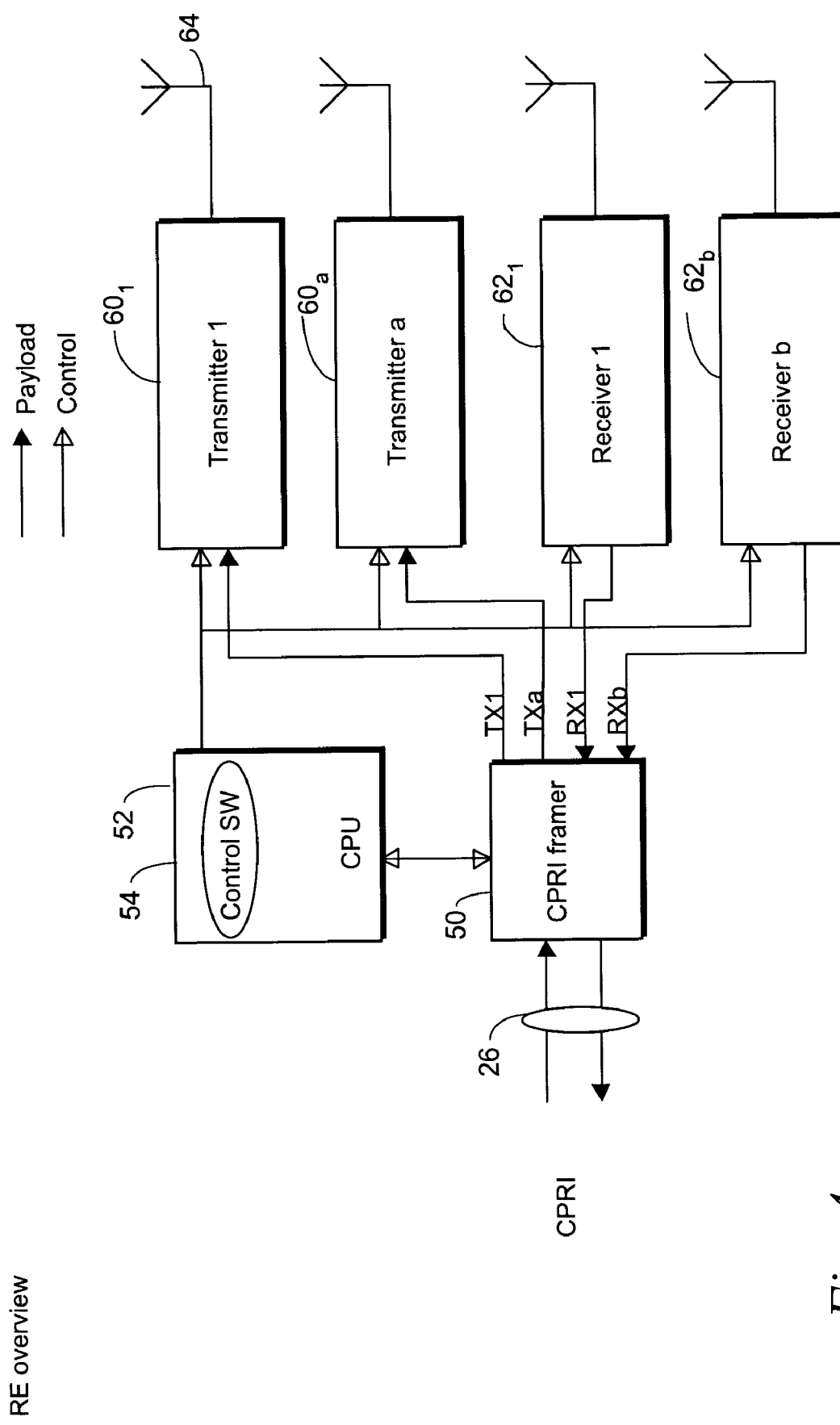
FIG. 4 is a schematic view of selected aspects of an example radio equipment (RE) portion of the distributed radio base station of FIG. 4.

FIG. 4 shows pertinent basic aspects of an example radio equipment (RE) 24 as comprising a framer 50 which is ultimately connected to internal interface 26, i.e., the CPRI interface. The framer 50 works in conjunction with a CPU or processor 52 of radio equipment (RE) 24. The processor 52 executes control software (SW) 54 which governs operation, e.g., of framer 50 and terminates the application layer communication towards the radio equipment controller (REC) 22. In addition, radio equipment (RE) 24 comprises plural transmitters (such as transmitter $60_1$ and transmitter $60_a$), and plural receivers (such as receiver $62_1$ and receiver $62_b$). The transmitters 60 and receivers 62 can be either single-standard or multistandard. Each transmitter 60 and each receiver 62 is connected to a corresponding antenna 64 (which is distinct from and does not comprise radio equipment (RE) 24). The framer 50 is connected to forward payload information obtained from internal interface 26 to each of the transmitters 60 (as shown by lines terminated with solid arrowheads), and to receive information from each of the receivers 62 to be forwarded from radio equipment (RE) 24 over the internal interface 26 to radio equipment controller (REC) 22 (again as indicated by lines terminated with solid arrowheads, but having a reverse direction toward rather than away from framer 50). The processor 52 is connected to send control information or control signals to each of framer 50, the transmitters 60, and the receivers 62, as shown by lines terminated with non-solid arrowheads).

Figure 5:
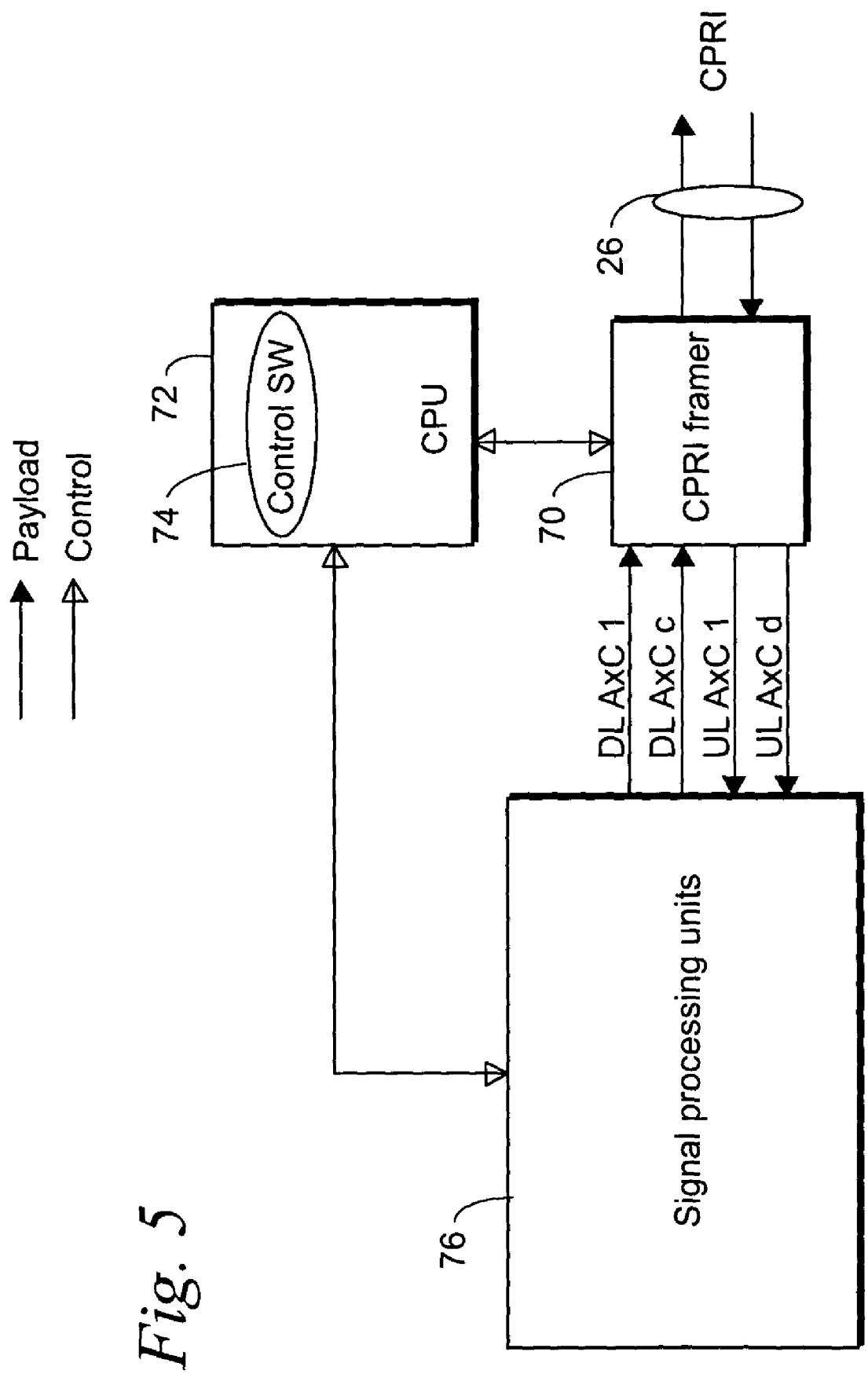
FIG. 5 is a schematic view of selected aspects of a radio equipment controller (REC) portion of the distributed radio base station of FIG. 4.

FIG. 5 shows pertinent basic aspects of an example radio equipment controller (REC) 22 as comprising a framer 70 which is ultimately connected to internal interface 26, i.e., the CPRI interface. The framer 70 works in conjunction with a CPU or processor 72 of radio equipment controller (REC) 22. The processor 72 executes control software (SW) 74 which governs operation, e.g., of framer 70. In addition, radio equipment controller (REC) 22 comprises signal processing units collectively indicated as 76 in FIG. 5. The radio equipment controller (REC) 22 of FIG. 5 is shown as handling antenna carriers (AxC) AxC 1 and AxC c on the downlink (DL), and antenna carriers (AxC) AxC 1 and AxC d on the uplink (UL).

Figure 6:
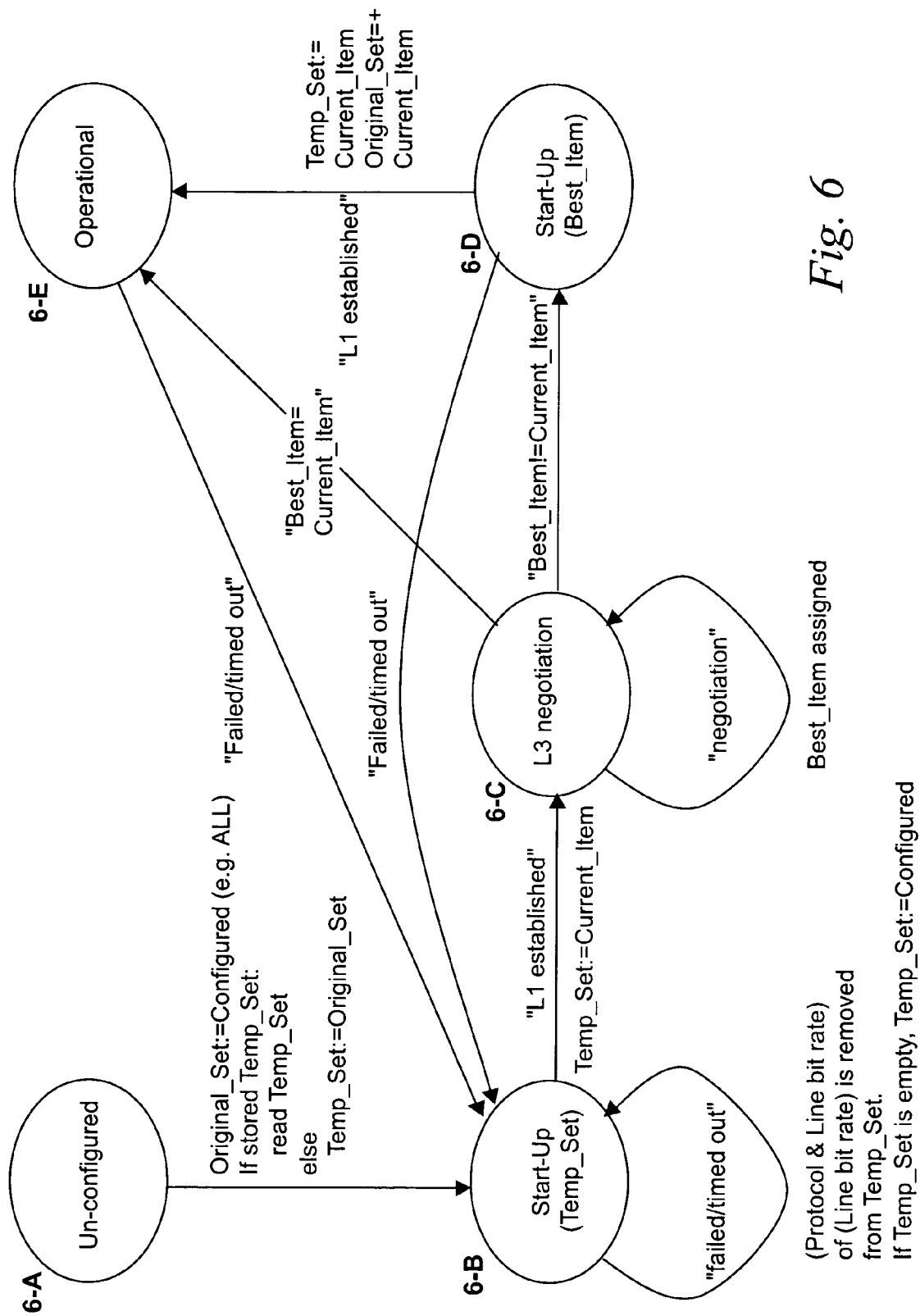
FIG. 6 is a diagrammatic view showing selected basic states of an example mode of a pre-start-up procedure performed by a distributed radio base station.
Figure 11:
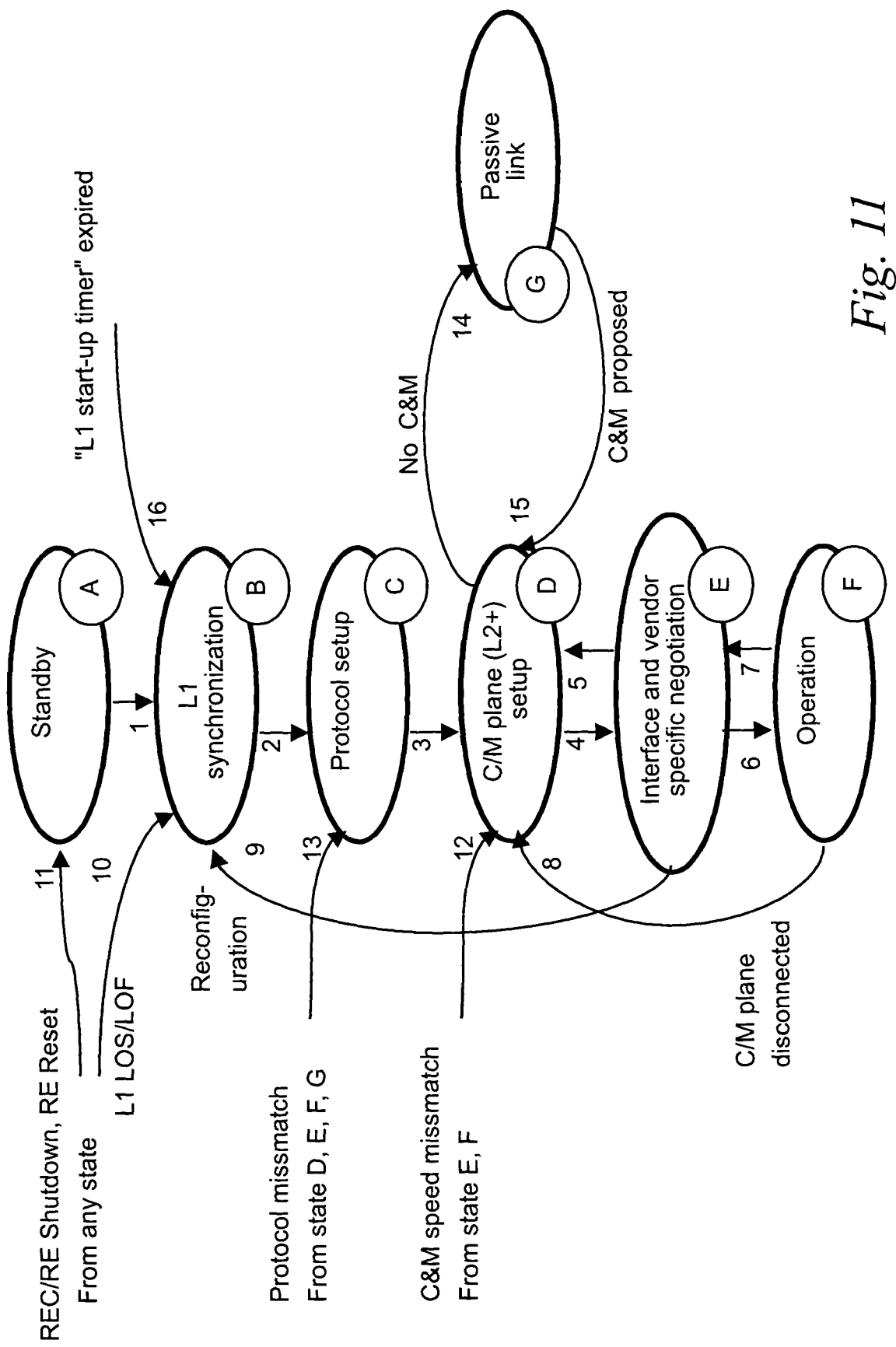
FIG. 11 is a diagrammatic view showing states of an example standard start-up procedure in conjunction with which the pre-start-up procedure of FIG. 6 operates.

The radio base station 20 performs a pre-start-up procedure or method for the internal interface 26. FIG. 6 shows selected basic states of an example mode of the pre-start-up procedure performed by a distributed radio base station. The pre-start-up procedure is preformed preparatory to and/or in conjunction with a start-up procedure for the internal interface. As explained previously with respect to FIG. 11, the start-up procedure for the internal interface 26 serves to synchronize a physical layer and align line bit rate and protocol over the internal interface. In one example implementation, the internal interface 26 is a Common Public Radio Interface (CPRI).

Figure 8:
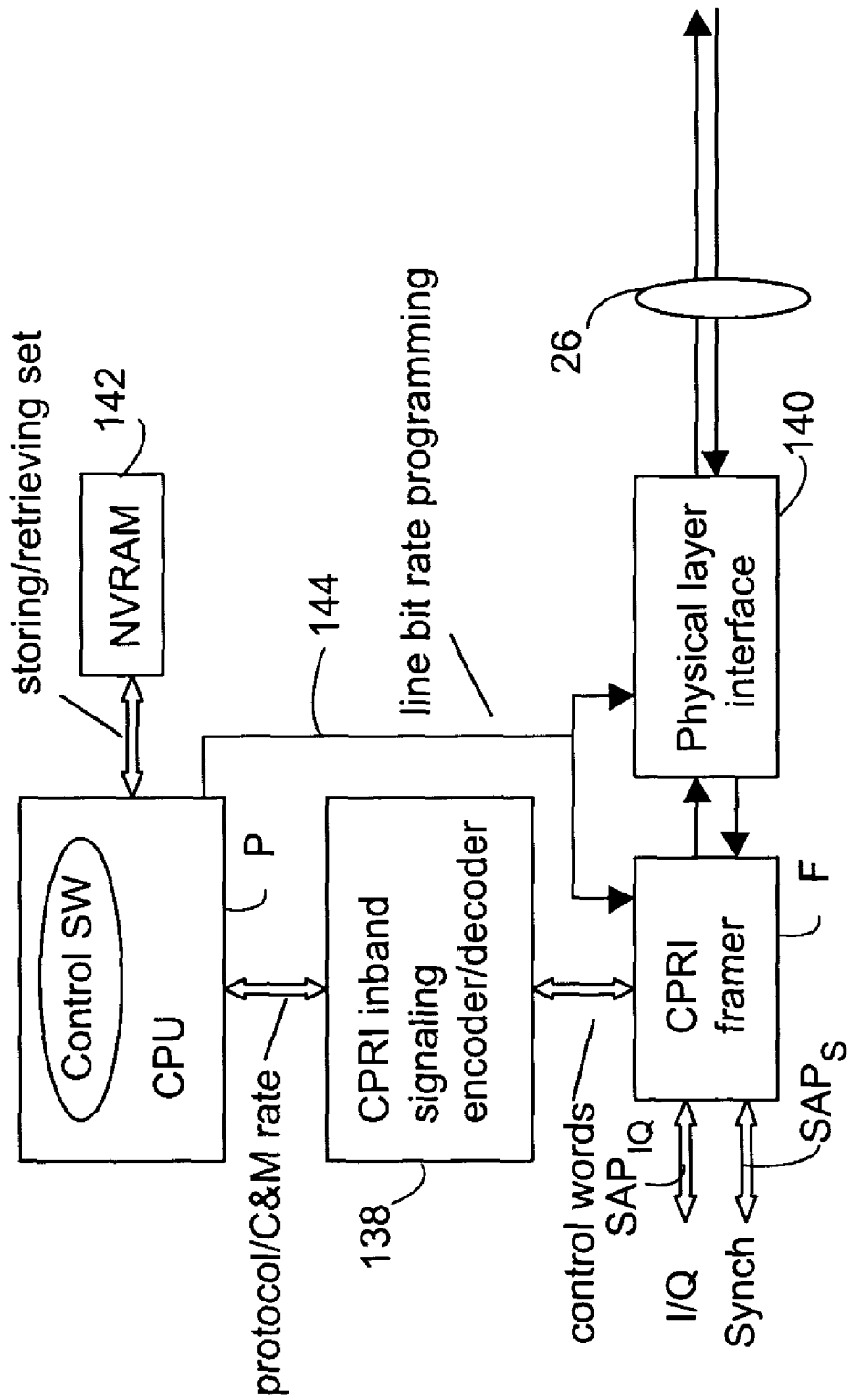
FIG. 8 is a schematic view of selected aspects of apparatus for performing the pre-start-up procedure of FIG. 6.

FIG. 8 shows other selected aspects of a portion of the distributed radio base station which are pertinent to the pre-start-up procedure herein described. The distributed radio base station portion shown in FIG. 8 can be either the radio equipment controller (REC) 22 or the radio equipment (RE) 24. The base station portion shown in FIG. 8 comprises a framer F and a processor P. As understood in terms of previously described FIG. 4 and FIG. 5, the framer F can be either framer 50 of radio equipment (RE) 24 or framer 70 of radio equipment controller (REC) 22, depending on whether the base station portion being illustrated is the radio equipment (RE) 24 or the radio equipment controller (REC) 22. Likewise, the processor P of the base station portion can be processor 52 of radio equipment (RE) 24 or processor 72 of radio equipment controller (REC) 22.

A control link which includes the service access point for the control and management connects the processor P and framer F. The service access point $SAP_{IQ}$ for the user plane information flow and the service access point $SAP_S$ for the synchronization are also shown, as well as the connection of framer F through physical layer interface 140 to internal interface 26.

On the control link intermediate the processor P and the framer F is an in-band signaling encoder/decoder 138. As explained hereinafter, the pre-start-up procedure is performed by a controller, which can take the form of the processor P or of a dedicated logic part (e.g., part of an ASIC) such as in-band signaling encoder/decoder 138. The processor P is also shown as having access to a memory, such as NVRAM 142. Moreover, line bit rate programming information is provided by processor P to framer F and physical layer interface, as depicted by line 144.

The basic states of the pre-start-up procedure shown in FIG. 6 include states 6-A through 6-E. Upon power on/reset of the base station portion, state 6-A is entered. In state 6-A, the controller creates a temporary available set (Temp_Set). As used herein, a "set" comprises one or more combinations of line bit rate and protocol. In state 6-A the Temp_Set is set to either the stored last good known combination, or to a Configured_Set if no stored last good known combination exists. The Configured_Set is a pre-stored list of a complete set the equipment can handle or a pre-configured subset thereof.

At state 6-B the controller initiates execution of the start-up procedure for the internal interface. If the internal interface 26 is a CPRI link, then the start-up procedure can be that illustrated in FIG. 11. If the start-up procedure as initiated at state 6-B fails, the corresponding failing combination of protocol and or line bit rate is removed form the Temp_Set. If the Temp_Set is or becomes empty, the Temp_Set is set to the Configured_Set. Such can typically happen if a too optimistic Temp_Set is used, e.g. a wrongly stored last good known combination Thus, as one of its aspects, the pre-start-up procedure involves storing one or more previously proven combinations of line bit rate and protocol as stored combination(s) for use on the internal interface. Prior to synchronization of the internal interface, the stored combination(s) are retrieved and included in the temporary available set (Temp_Set) of combinations of line bit rate and protocol (e.g., at state 6-A). Thereafter the start-up procedure for the internal interface is initiated (state 6-B) for the purpose of determining efficacy of the temporary available set.

In another of its aspects, after the pre-start-up procedure has initiated (at state 6-B) the start-up procedure for the internal interface to determine efficacy of a set of combinations of line bit rate and protocol, the pre-start-up procedure removes a failed combination of line bit rate and protocol from the set should the start-up procedure fail.

Should the start-up procedure as initiated at state 6-B result in synchronization of the physical layer (e.g., L1 synchronization is established), the result of the start-up procedure at state 6-B is a valid common combination (illustrated in FIG. 6 as "Current_Item"). The resulting valid combination from the start-up procedure is stored by the controller and subsequently used for negotiating a best combination. As described hereinafter, the resulting valid combination from the start-up procedure is used if the start-up procedure using the best combination fails. The best combination is stored if the start-up procedure using it succeeds.

A successful synchronization at state 6-B results in a transition to state 6-C. In state 6-C, the applications on both sides of the interface communicate and commonly agree (e.g., negotiate) on the best combination of line bit rate and protocol (which is labeled in FIG. 6 as "Best_Item"). For example, this negotiation at state 6-C can be performed by control software (SW) in radio equipment controller (REC) 22 talking with control software (SW) in radio equipment (RE) 24.

If it is determined at state 6-C that the Best_Item as negotiated is equal to the valid combination ("Current_Item") which resulted from state 6-B, at state 6-6 it is realized that the optimum combination of line bit rate and protocol has already been selected. Therefore, in this case, there is a direct transition to state 6-E. If, on the other hand, the "Best_Item" as negotiated at state 6-C is not equal to the valid combination which resulted from state 6-B (i.e., the "Best Item" is not the "Current_Item"), then at state 6-D the start-up procedure is entered with only the Best_Item as the available set. Moreover, the temporary active set is configured to be the valid combination of line bit rate and protocol, and the valid combination of line bit rate and protocol is also included in a configured set of combinations of line bit rate and protocol.

If the start up procedure at state 6-D is successful (which it should be) state 6-E is entered. But if for any reason the start up procedure is unsuccessful, the state E is entered again, using the last good known combination (Current_Item) as "available set" to speed up the process of reaching state 6-C again.

In transitions to state 6-C, state 6-D, and state 6-E, the Temp_Set is set to the Current_Item, i.e. the Temp_Set in these cases equals a known good combination. In state 6-C and 6-E, the Temp_Set is also stored for fast acquisition in case of a reset.

From the foregoing it can be seen that, should synchronization of the physical layer by the start-up procedure succeed at state 6-B, the pre-start-up procedure uses a valid combination of line bit rate and protocol in the available set for negotiating (at state 6-C) between the radio equipment controller (REC) and the radio equipment (RE). A best combination of line bit rate and protocol is determined during the negotiating. Should the valid combination be agreed at state 6-C to be the best combination during the negotiating, the start-up procedure is ended and state 6-E is entered. On the other hand, should the valid combination not be the best combination, only the best combination of line bit rate and protocol is included in the available set, and thereafter the start-up procedure is restarted. At various junctures the temporary active set is set to be the valid combination of line bit rate and protocol in order to expedite processing should the start-up procedure fail.

The time to switch between different line bit rates within an "available set" is defined in the CPRI specification, and is very demanding. As another of its aspects, illustrated in part in FIG. 7, the pre-start-up procedure simplifies hardware and allows a longer time to switch between different line bit rates during state 6-B.

Figure 7:
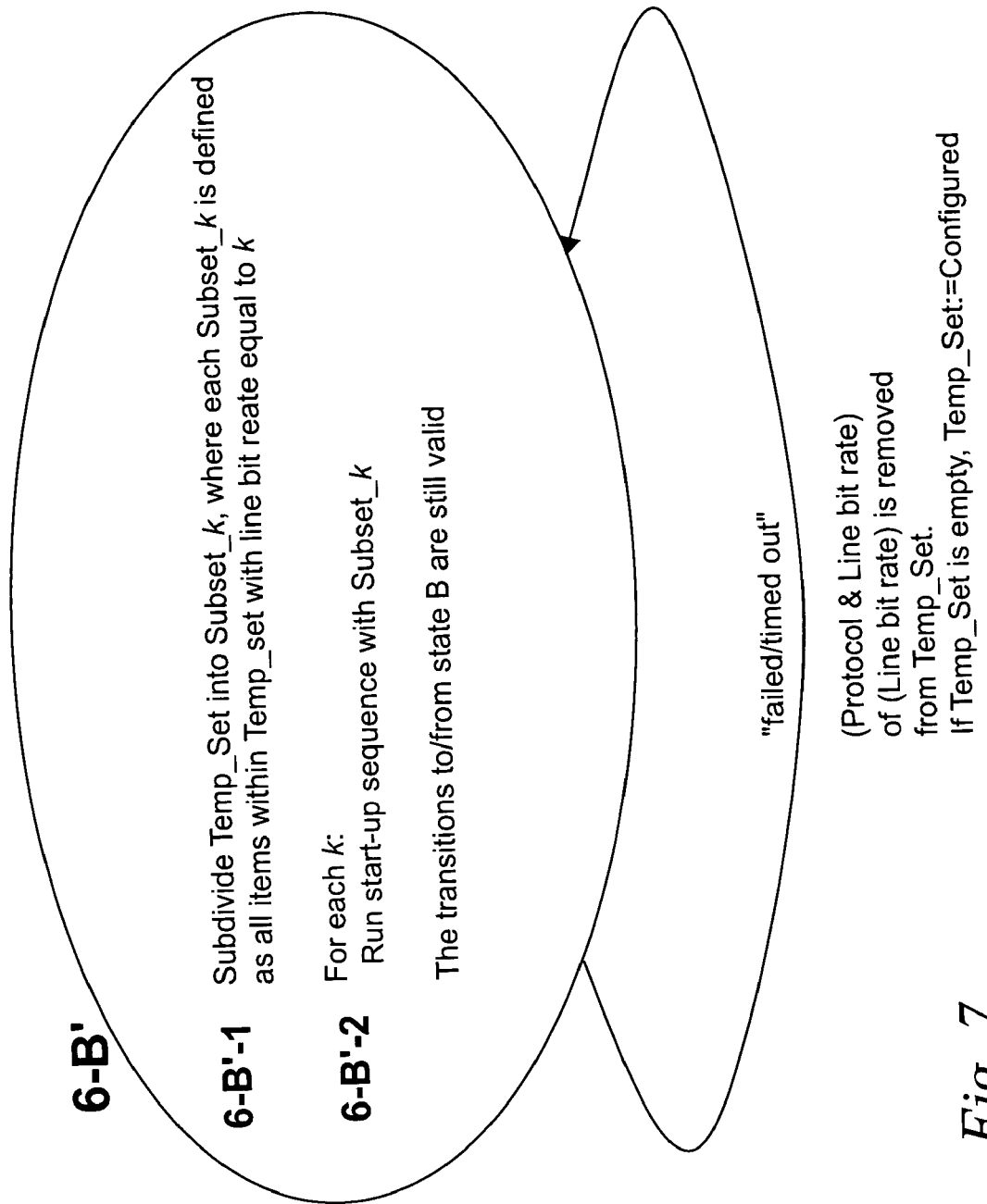
FIG. 7 is a diagrammatic view showing optional further actions that can be performed in the example pre-start-up procedure shown in FIG. 6.

In this optional aspect of FIG. 7, as step 6-B'-1 the pre-start-up procedure classifies the temporary available set into plural subsets, each subset of the temporary available set containing combinations of line bit rate and protocol having a same line bit rate. For example, the Temp_Set can be divided into k number of subsets, so that each Subset_k is defined as all items in Temp_Set which have a line bit rate equal to k. Then, as step 6-B'-2, the pre-start-up procedure separately initiates the start-up procedure for the internal interface for each subset. In other words, for each k the start-up procedure is run with Subset_k. As previously, the transitions to and from state 6-B are still valid.

The pre-start-up procedure can sequence in a predefined or preferred order the use of the subsets in the initiations of the start-up procedure. Since switching between different line bit rates takes time, this aspect of the pre-start-up procedure simplifies hardware design. By using this aspect, the pre-start-up procedure does not have repeatedly to perform a fast change between different line bit rates, but can instead use one bit rate, then let the "start-up" timer expire, and then test the next line bit rate. This allows a simple hardware implementation which is still compliant with the Common Public Radio Interface Specification Version 1.0 (Sep. 26, 2003) and Version 1.1 (May 10, 2004).

Figure 9:
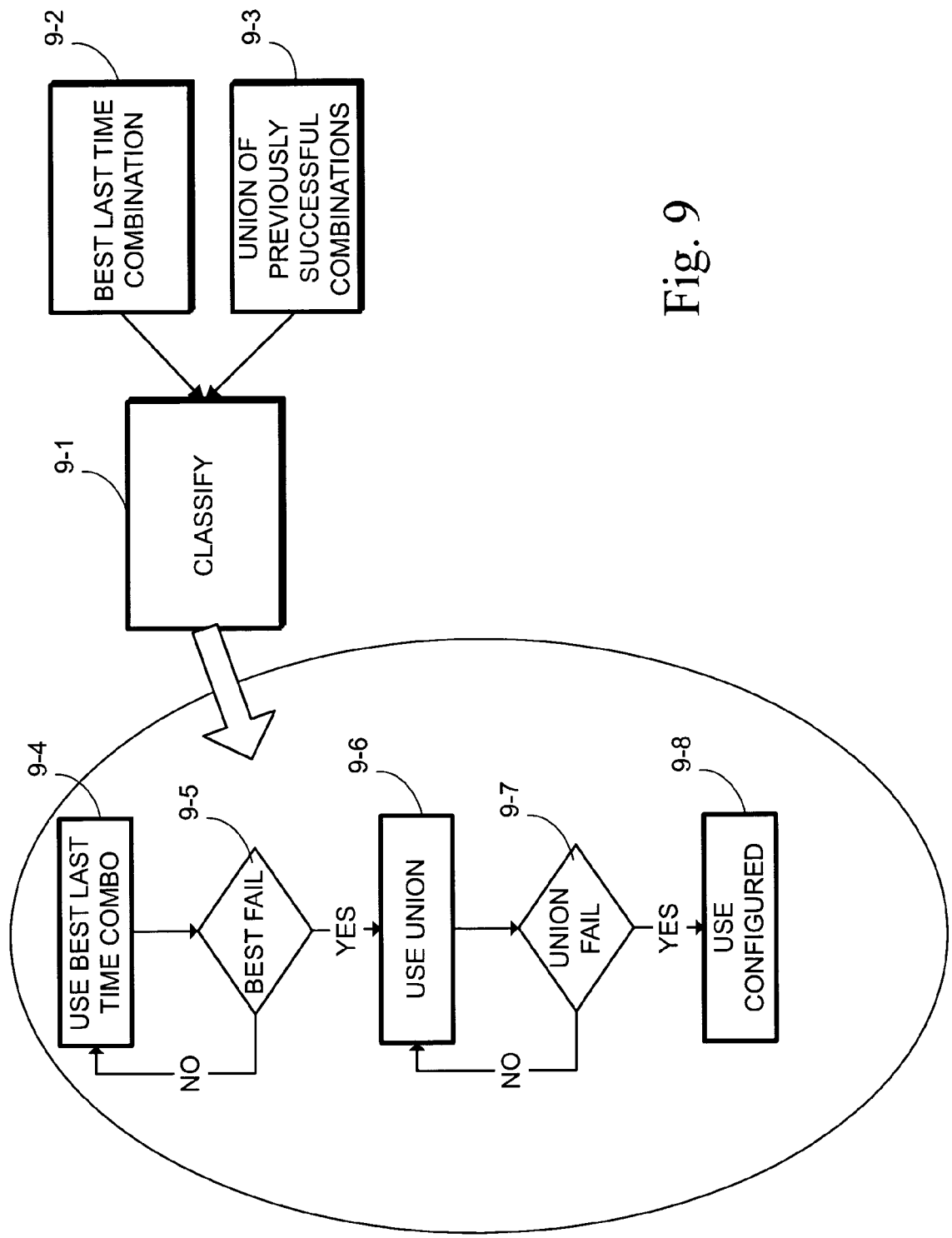
FIG. 9 is a flowchart showing a mode of a pre-start-up procedure which classifies and selectively uses combinations.

In another of its aspects illustrated in FIG. 9, the pre-start-up procedure classifies (as action 9-1) the stored combinations into two classification. A first classification (9-2) is a best last time combination of line bit rate and protocol which was involved in a last successful execution of the start-up procedure. A second classification (9-3) is a union all combinations of line bit rate and protocol for which the synchronization of the physical layer has previously been successful during the start-up procedure. Capitalizing upon this classification, as action 9-4 the pre-start-up procedure can use the best last time combination as the temporary available set for initiating the start-up procedure for the internal interface. Then, if (as determined at action 9-5) the start-up procedure fails with the best last time combination, the pre-start-up procedure can as action 9-6 resort to using the union of all combinations as the temporary available set for initiating the start-up procedure for the internal interface. If (as determined at action 9-7) the start-up procedure fails with the union of all previously successful combinations, the pre-start-up procedure can as action 9-8 resort to the configured set. Both the best last time combination and the union of all previously successful combinations can be (separately) stored in non-volatile RAM, such as NVRAM 142.

The in-band signaling encoding/decoding (e.g., CPRI in-band signaling encoding/decoding) is either done by control software (SW) in the processor P or by a dedicated logic (e.g., part of an ASIC). The control of the line bit rate on the physical interface is either controlled directly by the control software (SW) in processor P or by the in-band signaling encoder/decoder 138. The line bit rate choice is used in the framing (e.g., CPRI framing) and the physical layer interface.

Typically, the control software (SW) has the information about the Original Set, the Temp_Set, etc., and programs and the CPRI circuits (framer, physical layer, and encoder/decoder) when switching line bit rate. The protocol negotiation is typically done by the in-band signaling encoder/decoder 138 and also the C&M link rate. The synchronization to a line bit rate is typically done by the framer F. As mentioned above, the negotiation of state 6-C is done by the control software (SW) in the radio equipment (RE) 24 talking with the control software (SW) in the radio equipment controller (REC) 22.

The Common Public Radio Interface Specification Version 1.0 (Sep. 26, 2003) and Version 1.1 (May 10, 2004) is very flexible concerning actual implementation of where the negotiations (protocol revision, C&M rate) are to be performed. The time to answer is set so high that the software (SW) can read out the inband signaling, evaluate it, and write a new one (encoder/decoder in software). The negotiations are also made so simple that it can be implemented in hardware (e.g., in-band signaling encoder/decoder 138). One implementation example is that the basic negotiation is performed by a hardware implementation of the "CPRI inband signaling encoder/decoder" and that the enhancements (outer loop, e.g., pre-start-up procedure) are done by the control software (SW). The one line bit rate at a time aspect described in FIG. 7 will then move the line bit rate change from hardware to the control software (SW), making the hardware cheaper and simpler.

Figure 10A:
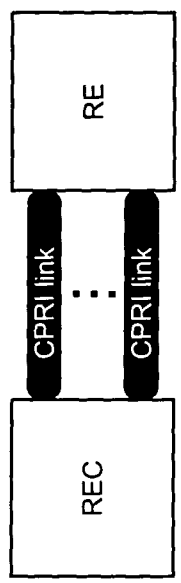
FIG. 10A is a diagrammatic view showing several internal interface physical links connecting a radio equipment controller (REC) and a radio equipment (RE).
Figure 10B:
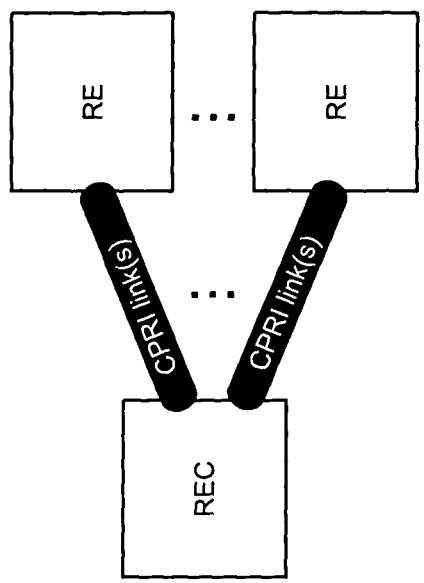
FIG. 10B is a diagrammatic view showing several radio equipment entities (RE) being served by one radio equipment controller (REC).

The invention has been described in a basic configuration in which one radio equipment controller (REC) 22 and one radio equipment (RE) 24 are connected by a single CPRI physical link. The invention is not limited to this configuration, but should be understood to be extended to other configurations including but not limited to those described in Common Public Radio Interface Specification Version 1.0 (Sep. 26, 2003) and Version 1.1 (May 10, 2004). For example, as illustrated in FIG. 10A, the invention may be implemented in a configuration in which several CPRI physical links can be used to enhance the system capacity required for large system configurations involving many antennas and carriers. Moreover, as illustrated in FIG. 10B, several radio equipment entities may be served by one radio equipment controller (REC) 22.

The pre-start-up procedure as described above in one or more of its aspects has numerous advantages and facilitates numerous benefits. For example, the pre-start-up procedure combines automatic configuration (plug and play) with a fast restart, and in one example mode is fully compliant with Common Public Radio Interface Specification Version 1.0 (Sep. 26, 2003) and Version 1.1 (May 10, 2004). The pre-start-up procedure stores and retrieves one or more known good combination for faster start up. As an option, the pre-start-up procedure removes bad combinations of line bit rates and protocol when detected, and removes bad combinations of line bit rates when detected. In one of its aspects, the pre-start-up procedure tries the start up procedure first with a small set of combinations, and increasing the set when the first small set proves to be too small. Further, the pre-start-up procedure can add every successful combination to the known good set. In one of its aspects, the pre-start-up procedure runs the start up procedure one line bit rate at a time.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A radio base station comprising:
   a radio equipment controller (REC) portion;
   a radio equipment (RE) portion;
   an internal interface which connects the radio equipment controller (REC) portion and the radio equipment (RE) portion;
   at least one of the portions comprising:
      a memory for storing one or more previously proven combinations of line bit rate and protocol as stored combination(s) for use on the internal interface;
      a controller which, prior to synchronization of the internal interface:

(1) retrieves the stored combination(s) and includes at least one of the stored combination(s) in a temporary available set of combinations of line bit rate and protocol;
(2) initiates a start-up procedure for the internal interface to determine efficacy of the temporary available set for synchronization of a physical layer and alignment of line bit rate and protocol over the internal interface;
(3) should synchronization of a physical layer by the start-up procedure succeed, stores a resulting valid combination from the start-up procedure and uses the resulting valid combination for negotiating a best combination; and
(4) sets the temporary active set to be the valid combination of line bit rate and protocol should the best combination fail in the start-up procedure.

2. The apparatus of claim 1, wherein the internal interface is a Common Public Radio Interface (CPRI).

3. The apparatus of claim 1, wherein, should the start-up procedure fail, the controller removes a failed stored combination of line bit rate and protocol from the temporary available set.

4. The apparatus of claim 3, further comprising, should the start-up procedure fail, the controller includes a configured set of combinations of line bit rate and protocols in the temporary available set.

5. The apparatus of claim 1, wherein the controller stores the best combination if the best combination succeeds in the start-up procedure.

6. The apparatus of claim 1, wherein the controller uses the best combination of line bit rate and protocol during the start-up procedure should the valid combination not be agreed to be the best combination during the negotiating.

7. The apparatus of claim 4, wherein the controller includes only the best combination of line bit rate and protocol in the available set should the valid combination not be the best combination.

8. The apparatus of claim 7, wherein the controller sets the temporary active set to be the valid combination of line bit rate and protocol.

9. The apparatus of claim 7, wherein the controller includes the valid combination of line bit rate and protocol in a configured set of combinations of line bit rate and protocol.

10. A radio base station comprising:
a radio equipment controller (REC) portion;
a radio equipment (RE) portion;
an internal interface which connects the radio equipment controller (REC) portion and the radio equipment (RE) portion;
at least one of the portions comprising:
a memory for storing one or more previously proven combinations of line bit rate and protocol as stored combination(s) for use on the internal interface;
a controller which, prior to synchronization of the internal interface:
(1) retrieves the stored combination(s) and includes at least one of the stored combination(s) in a temporary available set of combinations of line bit rate and protocol;
(2) initiates a start-up procedure for the internal interface to determine efficacy of the temporary available set for synchronization of a physical layer and alignment of line bit rate and protocol over the internal interface
(3) classifies the temporary available set into plural subsets, each subset of the temporary available set containing combinations of line bit rate and protocol having a same line bit rate; and wherein the controller separately initiates the start-up procedure for the internal interface for each subset in predefined order to avoid repeatedly performing change between different bit line rates.

11. The apparatus of claim 10, wherein the controller performs a sequence of initiations of the start-up procedure.

12. The apparatus of claim 1, wherein the controller classifies the stored combinations as: (1) a best last time combination of line bit rate and protocol which was involved in a last successful execution of the start-up procedure; and (2) a union all combinations of line bit rate and protocol for which the synchronization of the physical layer has previously been successful during the start-up procedure.

13. The apparatus of claim 12, wherein the controller uses the best last time combination as the temporary available set for initiating the start-up procedure for the internal interface; and if the start-up procedure fails, the controller uses the union of all combinations as the temporary available set for initiating the start-up procedure for the internal interface.

14. A method of operating a radio base station having an internal interface connecting a radio equipment (RE) and a radio equipment controller (REC), the method comprising:
storing one or more previously proven combinations of line bit rate and protocol as stored combination(s) for use on the internal interface;
prior to synchronization of the internal interface, retrieving the stored combination(s) and including at least one of the stored combination(s) in a temporary available set of combinations of line bit rate and protocol;
initiating a start-up procedure for the internal interface to determine efficacy of the temporary available set for synchronization of a physical layer and alignment of line bit rate and protocol over the internal interface;
should synchronization of a physical layer by the start-up procedure succeed, storing a valid combination of line bit rate and protocol in the available set for negotiating between the radio equipment controller (REC) and the radio equipment (RE);
setting the temporary active set to be the valid combination of line bit rate and protocol should the best combination fail in the start-up procedure.

15. The method of claim 14, further comprising storing the best combination if the best combination succeeds in the start-up procedure.

16. The method of claim 14, further comprising setting the temporary active set to be the valid combination of line bit rate and protocol.

17. The method of claim 14, further comprising using the best combination of line bit rate and protocol during the start-up procedure should the valid combination not be agreed to be the best combination during the negotiating.

18. The method of claim 17, further comprising including only the best combination of line bit rate and protocol in the available set should the valid combination not be the best combination; and
using the available set during the start-up procedure.

19. The method of claim 18, further comprising setting the temporary active set to be the valid combination of line bit rate and protocol.

20. The method of claim 18, further comprising including the valid combination of line bit rate and protocol in a configured set of combinations of line bit rate and protocol.

21. A method of operating a radio base station having an internal interface connecting a radio equipment (RE) and a radio equipment controller (REC), the method comprising:

storing one or more previously proven combinations of line bit rate and protocol as stored combination(s) for use on the internal interface;

prior to synchronization of the internal interface, retrieving the stored combination(s) and including at least one of the stored combination(s) in a temporary available set of combinations of line bit rate and protocol;

initiating a start-up procedure for the internal interface to determine efficacy of the temporary available set for synchronization of a physical layer and alignment of line bit rate and protocol over the internal interface;

classifying the temporary available set into plural subsets, each subset of the temporary available set containing combinations of line bit rate and protocol having a same line bit rate;

separately initiating the start-up procedure for the internal interface for each subset in predefined order to avoid repeatedly performing change between different bit line rates.

22. The method of claim 21, further comprising performing a sequence of initiations of the start-up procedure.

23. The method of claim 14, further comprising classifying the stored combinations as: (1) a best last time combination of line bit rate and protocol which was involved in a last successful execution of the start-up procedure; and (2) a union all combinations of line bit rate and protocol for which the synchronization of the physical layer has previously been successful during the start-up procedure.

24. The method of claim 23, further comprising:

using the best last time combination as the temporary available set for initiating the start-up procedure for the internal interface; and if the start-up procedure fails, using the union of all combinations as the temporary available set for initiating the start-up procedure for the internal interface.

25. A method of operating a radio base station having an internal interface connecting a radio equipment (RE) and a radio equipment controller (REC), the method comprising:

(1) storing one or more previously proven combinations of line bit rate and protocol as stored combination(s) for use on the internal interface;

(2) prior to synchronization of the internal interface, retrieving the stored combination(s) and including at least one of the stored combination(s) in a temporary available set of combinations of line bit rate and protocol;

(3) initiating a start-up procedure for the internal interface to determine efficacy of the temporary available set for synchronization of a physical layer and alignment of line bit rate and protocol over the internal interface;

(4) should synchronization of a physical layer by the start-up procedure succeed, storing a valid combination of line bit rate and protocol in the available set and using the valid combination for negotiating a best combination between the radio equipment controller (REC) and the radio equipment (RE);

(5) if the valid combination is not the best combination, including only the best combination in the available set and restarting the start-up procedure;

(6) if the best combination fails upon restarting the start-up procedure, setting the temporary active set to be the valid combination of line bit rate and protocol.

26. A radio base station comprising:

a radio equipment controller (REC) portion;

a radio equipment (RE) portion;

an internal interface which connects the radio equipment controller (REC) portion and the radio equipment (RE) portion;

at least one of the portions comprising:

a memory for storing one or more previously proven combinations of line bit rate and protocol as stored combination(s) for use on the internal interface;

a controller which, prior to synchronization of the internal interface:

(1) retrieves the stored combination(s) and includes at least one of the stored combination(s) in a temporary available set of combinations of line bit rate and protocol;

(2) initiates a start-up procedure for the internal interface to determine whether use of the temporary available set results in synchronization of a physical layer and alignment of line bit rate and protocol over the internal interface.

27. A method of operating a radio base station having an internal interface connecting a radio equipment (RE) and a radio equipment controller (REC), the method comprising:

storing one or more previously proven combinations of line bit rate and protocol as stored combination(s) for use on the internal interface;

prior to synchronization of the internal interface, retrieving the stored combination(s) and including at least one of the stored combination(s) in a temporary available set of combinations of line bit rate and protocol;

initiating a start-up procedure for the internal interface to determine whether use of the temporary available set results in synchronization of a physical layer and alignment of line bit rate and protocol over the internal interface.

28. The method of claim 14, wherein the internal interface is a Common Public Radio Interface (CPRI).

29. The method of claim 14, further comprising, should the start-up procedure fail, removing a failed stored combination of line bit rate and protocol from the temporary available set.

30. The method of claim 29, further comprising, should the start-up procedure fail, including a configured set of combinations of line bit rate and protocols in the temporary available set.

31. The method of claim 25, further comprising performing a sequence of initiations of the start-up procedure.

32. The method of claim 25, wherein the internal interface is a Common Public Radio Interface (CPRI).

* * * * *

UNITED STATES PATENT AND TRADEMARK OFFICE
CERTIFICATE OF CORRECTION

PATENT NO. : 7,856,029 B2
APPLICATION NO. : 10/909843
DATED : December 21, 2010
INVENTOR(S) : Österling et al.

It is certified that error appears in the above-identified patent and that said Letters Patent is hereby corrected as shown below:

On the Title Page, Item (12), under "United States Patent", in Column 1,
Line 1, delete "Osterling" and insert -- Österling --, therefor.

On the Title Page, Item (75), under "Inventors", in Column 1, Line 1,
delete "Osterling," and insert -- Österling, --, therefor.

On the Title Page, Item (57), under "ABSTRACT", in Column 2, Line 4,
after "internal", insert -- interface --.

On the Title Page, Item (57), under "ABSTRACT", in Column 2, Line 7, delete "on c"
and insert -- one --, therefor.

In Fig. 4, Drawing Sheet 5 of 11, delete " 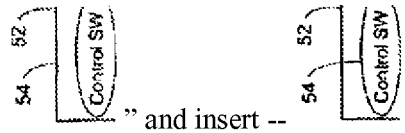 " and insert -- -- , therefor.

In Fig. 7, Drawing Sheet 8 of 11, for "6-B'-1", in Line 2, delete "bit reate" and insert -- bit rate --,
therefor.

In Column 1, Line 66, delete "Telecommunications" and insert -- Telecommunications System --,
therefor.

In Column 7, Line 8, delete "an a" and insert -- and an --, therefor.

Signed and Sealed this
Fourteenth Day of August, 2012

David J. Kappos
*Director of the United States Patent and Trademark Office*